March 6, 1956
A. M. THOMSEN
2,737,449
METHOD OF EXTRACTING HALOGENS
Filed May 26, 1952
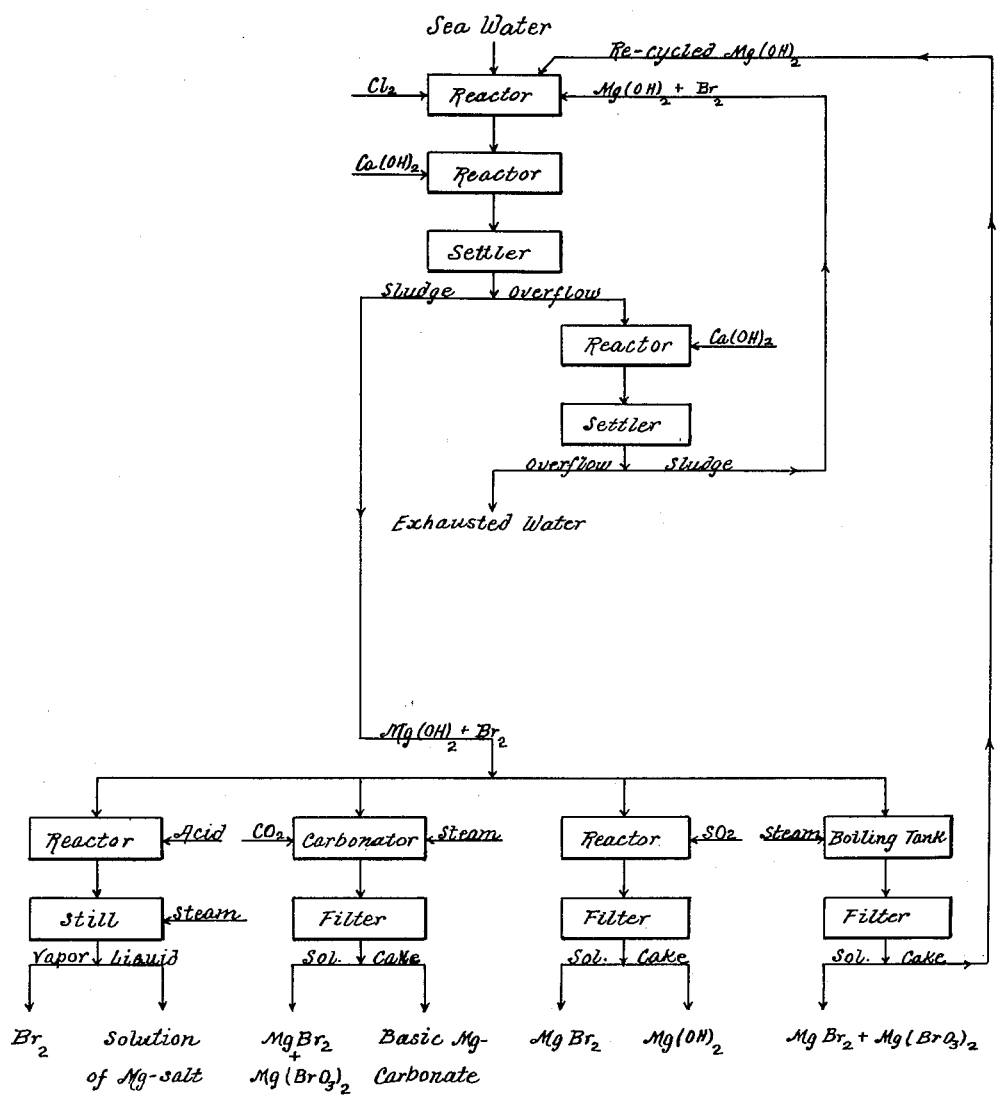
INVENTOR
Alfred M. Thomsen

United States Patent Office 2,737,449
Patented Mar. 6, 1956

2,737,449

METHOD OF EXTRACTING HALOGENS

Alfred M. Thomsen, San Francisco, Calif.

Application May 26, 1952, Serial No. 290,017

1 Claim. (Cl. 23—215)

The recovery of halogens, meaning by that term, the elements chlorine, bromine, iodine and fluorine, is generally accomplished by liberating said elements by some oxidizing technique and then separating the liberated halogen by volatilization, by absorption in activated charcoal, and other appropriate means. Unfortunately, these halogens though abundant in nature are yet present in small quantity when compared with the total mass of the material in which they are contained thus requiring costly and often wasteful methods for their recovery. As illustrations, the presence of bromine in sea water and other natural brines, and of iodine in oil well waters, may be cited. Recovery of chlorine and/or fluorine will be more properly applied to those artificial products emanating from industry and generally classified as "wastes."

Inasmuch as such products, be they natural or artificial, are generally quite dilute some form of inexpensive concentration is mandatory if any economic value is to be ascribed to such recovery of halogens. To effect such concentration I avail myself of the addition product of a substantially insoluble hydroxide and the form in which said halogen is liberated by some form of oxidation. The function of the hydroxide is to act as a collector and I may use at will hydroxides of iron, aluminum, zinc or magnesium.

While not as effective as hydroxides, carbonates possess to a certain extent the same property of forming addition products with the halogens and under singular conditions might be substituted. I also find that simple commingling of the hydroxide, prepared separately, with the substance to be treated either before or after the oxidizing treatment to liberate the halogen, is definitely inferior to the production of said hydroxide by precipitation with the proper reagent in the presence of the liberated halogen.

For practical purposes, however, the hydroxide selected will most often be that of magnesium and the reagent used to precipitate it burned lime or dolomite. The raw material for the process will be whatever substance contains the halogens under consideration. As a preferred version I have represented in the drawing the simultaneous winning from sea water some form of magnesium as well as the resident bromine. Inasmuch as the amount of magnesium hydroxide produced by adding lime to sea water is adequate to remove substantially all bromine resident therein there is probably no need for some of the alternative steps shown on the drawing but with higher grade material such as is yielded by wells they will apply. Similarly, if magnesium-free oil well waters are treated there is a place for the direct addition of magnesium hydroxide as well as the precipitation of some added soluble magnesium salt. For this reason I have illustrated all such steps as integral or alternative parts of a sea water operation.

It will be obvious that the mere substitution of the symbol I for Br would convert the drawing into an iodine circuit, with or without the addition of a soluble magnesium salt, which naturally is not needed with sea water. As a means of treating oil well brines for iodine and bromine, substantially all steps indicated would come into use.

The cheapness and hence the most desirable way of liberating iodine and bromine is the addition of chlorine to the raw material, either as such or as the hypochlorite. It should be noted that the reactions involved take place in a slightly alkaline medium instead of the acid mediums of the conventional procedures.

The application of my process to recovery of chlorine is limited to such effluents from plants that use chlorine as bleacheries. In the event that it is desired to render such discharges less objectionable and thus to decrease stream polution then the use of either a carbonate or hydroxide of magnesium in the manner herein indicated will be a profound help. The application to fluorine must be taken with many reservations, in view of the extreme activity of said element. Naturally, any actual fluorine in contact with water is out of the question, but the recovery of compound forms of fluorine by adsorption on magnesium or other metallic hydroxides may well be found to be of economic importance. To that extent, therefore, I deem my disclosure to apply.

The actual application of my process is simplicity itself. Taking the drawing as a preferred version it is only necessary to add a sufficient amount of chlorine to sea water to react with the combined bromine, the quantity needed being about 1 pound of chlorine for 2 pounds of bromine with a slight excess to compensate for the organic components of sea water. Enough lime is then added to precipitate the magnesium salts and the use of calcined dolomite as a substitute will be obvious. By settling or filtration or better by a combination of both this precipitate is now separated from the major part of the water and I have shown four ways in which it may be used. These involve solution, carbonation, reduction, and plain heating and each way has certain obvious advantages that will determine the selection.

One modification shown in the drawing requires explanation, namely the two stage addition of lime whereby two separate and distinct precipitates are obtained. Of these, the first portion is far richer in bromine than the second owing to the difference in equilibrium between bromine, magnesia, and water which is thus made possible. I have shown the second, which is poorer in bromine, re-cycled to fresh chlorinated water to pick up a fresh increment of bromine while the portion first obtained becomes the accepted portion that is passed on to the bromine extraction phase. Again, on sea water this is not likely to be used because of the poverty in bromine of the raw material but in other combinations it would result in better over-all extraction with a higher grade magnesia precipitate.

Reverting now once more to the treatment of the bromine enriched precipitate. On the extreme right I have shown this precipitate simply boiled with the production of magnesium hydroxide which is shown as re-cycled to the head of the process but such re-cycling, as already explained, is optional. I have then shown, going to the left, another portion which is treated with $SO_2$ and then filtered. The magnesia is obtained as the hydroxide as before but the bromine is obtained as a solution of magnesium bromide. In contra-distinction to this I have shown in the previous procedure the bromine obtained as a mixture of bromide and bromate. Manifestly, the ultimate use of the bromine determines the procedure preferred in the individual case. It is obvious that almost any reducing material could be substituted for the $SO_2$, but this is as good as any and will be found about the cheapest. Naturally, I do not limit myself to such use though I do prefer it. So far the magnesium involved has been obtained as the hydroxide, but if the carbonate is more desirable then it is only necessary to carbonate the precipitate before boiling, the bromine being obtained as in the first instance.

So far no actual bromine has been obtained but a relatively strong solution of bromide and bromate of magnesium, the concentration being about 30 to 1. Let sea water contain say 6 parts of bromine in 100,000 and the "concentrate" thus obtained will not be far from 2 parts per 1000. On material so rich only orthodox means are required to obtain said bromine in any form demanded by the market. Of course, much depends upon the amount of water left in the magnesia before processing, and in the above I have assumed that only settling has been used. Let a further increment of water be removed by filtration from this precipitate prior to processing for the contained bromine and the concentration will be much enhanced. If desired such water removal can be carried to the point where a concentrate containing over 1% of bromine can be obtained. Such procedure is, of course, optional with the operator and self-evident.

While I have so far discussed only the method of recovering magnesium as its hydroxide or carbonate it is evident that in some cases other salts of magnesium might be preferred. One illustration is presented by the use of the magnesium from sea water as its chloride in the manufacture of the metal. It is obvious that if said precipitate is dissolved in hydrochloric acid then the bromine is set free as elemental bromine simultaneously with the production of magnesium chloride. Distilling would prove the best manner of recovering the bromine in this instance, and, naturally, dilution with water should be made as little as possible. I have represented this phase of my process at the extreme left of the drawing.

While emphasis has been placed on bromine throughout, it is obvious that the traces of iodine in sea water will also be extracted but they will probably prove too small to be of economic importance. Similarly, any operator can take the above text and apply it to iodine with only such minor adjustments as will occur to any chemist.

It will be seen that the principal halogens that will be extracted by my process are iodine and bromine. Chlorine will only be involved incidentally in such cases as spent bleach liquors and fluorine only as a compound form. Naturally, many variations in technique are possible, thus: A wash water of a sulphite may be used in filtration of the hydroxide-halogen complex and said wash water will thus constitute the "concentrate" previously described, the act of washing being but a special case of "commingling." Again, where the complex obtained is dissolved in acid and the halogen thus set free, other means than distillation might be used to separate said halogen, for instance absorption in activated carbon, from which the halogen would then be obtained. All such minor variants I regard as within the scope of my disclosure.

Having thus fully described my process, I claim:

The method of extracting bromine from sea water which comprises; commingling said sea water with an amount of chlorine approximately equal to one-half of the weight of the bromine contained in said sea water; adding sufficient calcium hydroxide to the chlorinated sea water to precipitate substantially all the magnesium resident in said sea water; separating the complex of magnesium hydroxide and bromine thus produced; commingling the separated precipitate with sulphur dioxide thus converting the bromine contained in said precipitate into magnesium bromide; removing said magnesium bromide from the residual magnesium hydroxide by washing with water, thus obtaining the bromine originally resident in said sea water in the form of a solution of magnesium bromide separate and distinct from all other components of said sea water.

References Cited in the file of this patent

UNITED STATES PATENTS

| 1,937,995 | Thomsen | Dec. 5, 1933 |
| 2,082,989 | Thomsen | June 8, 1937 |